Aug. 6, 1940.　　　　E. G. MUELLER　　　　2,210,038
BRAKE MECHANISM
Filed Aug. 11, 1938　　　2 Sheets-Sheet 1
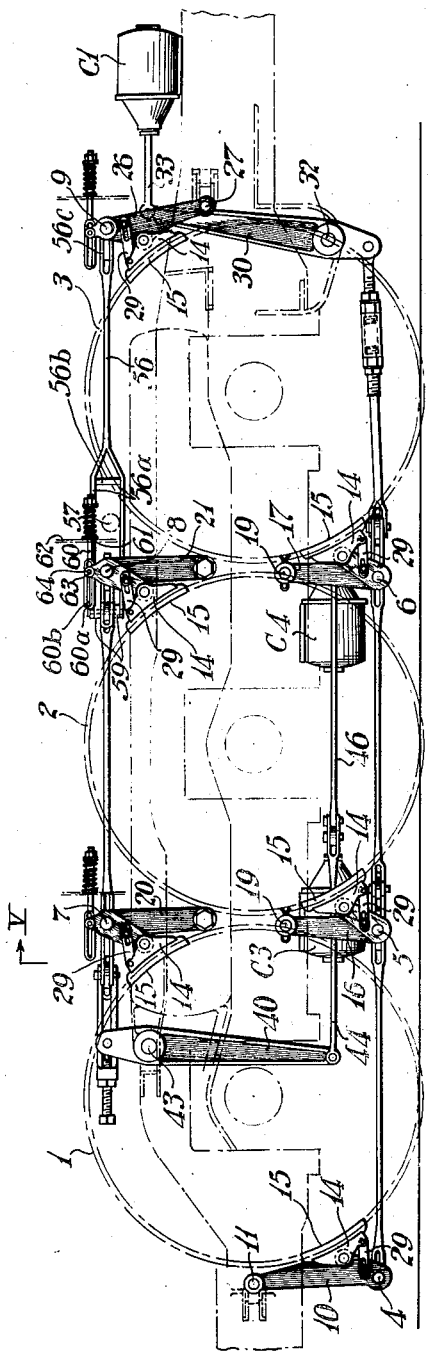
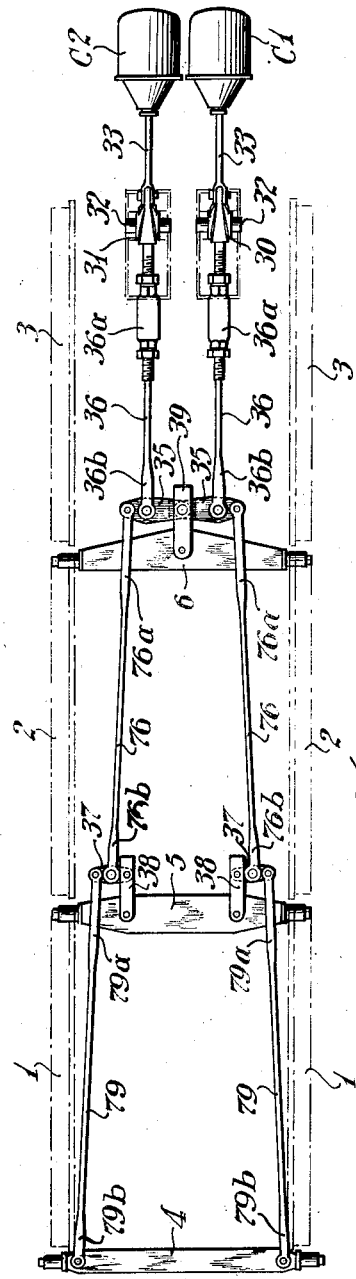
INVENTOR
Emil G. Mueller.
BY
ATTORNEY Aug. 6, 1940. E. G. MUELLER 2,210,038
BRAKE MECHANISM
Filed Aug. 11, 1938 2 Sheets-Sheet 2
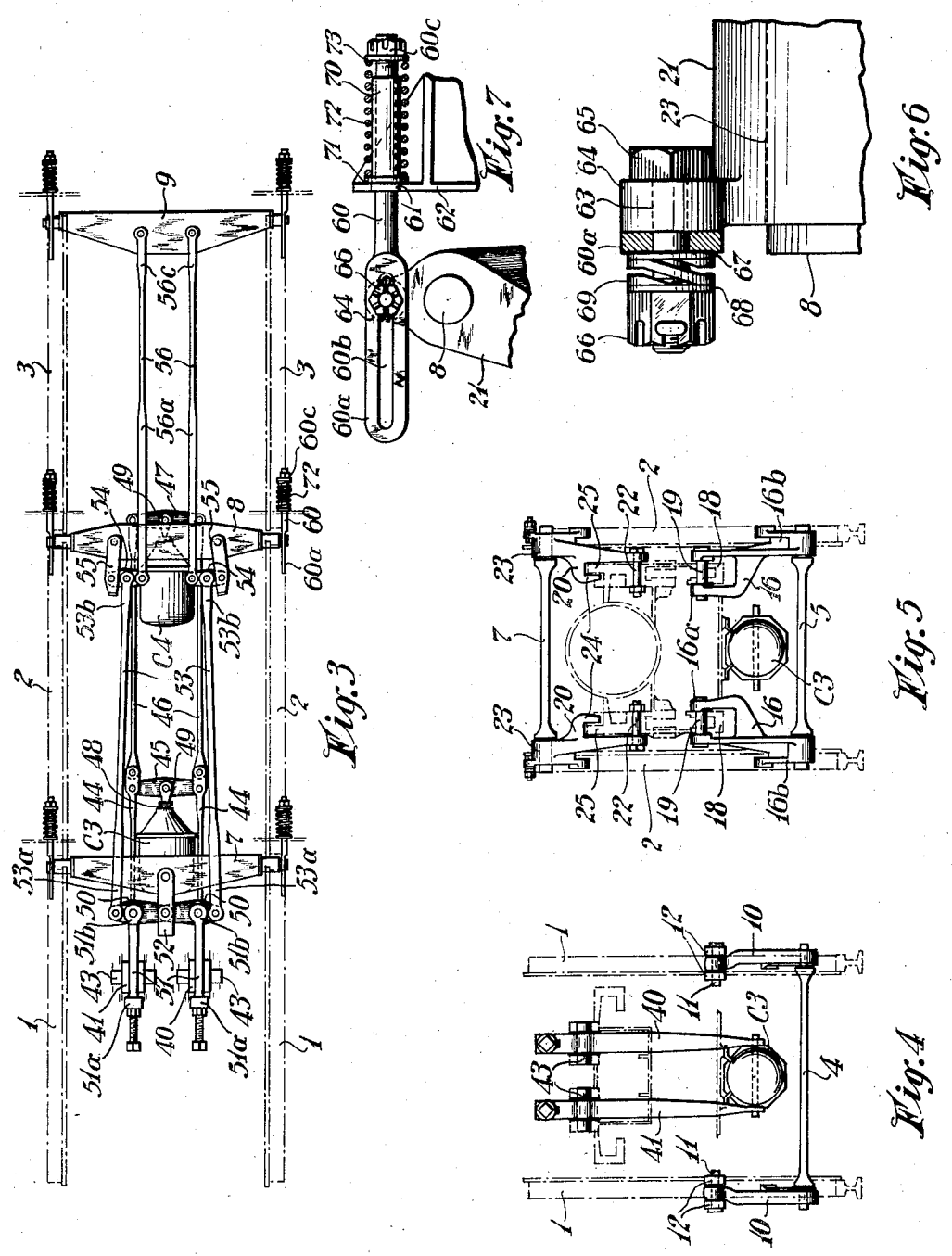
INVENTOR
Emil G. Mueller.
BY
ATTORNEY Patented Aug. 6, 1940

2,210,038

UNITED STATES PATENT OFFICE 2,210,038

BRAKE MECHANISM

Emil G. Mueller, Swissvale, Pa., assignor to The American Brake Company, Swissvale, Pa., a corporation of Missouri Application August 11, 1938, Serial No. 224,313

21 Claims. (Cl. 188—46)

My invention relates to brake mechanism, and particularly to brake mechanism for applying clasp brakes to the driving wheels of locomotives of the type in which the driving wheels are located as closely together as the necessary clearance between the wheels themselves will permit.

One feature of my invention consists in locating the two brake shoes associated with each wheel diametrically opposite each other in such positions that the one shoe is disposed some distance above, and the other shoe is disposed some distance below, the horizontal plane passing through the wheel centers, and in providing upper brake rigging for actuating all of the upper shoes and lower brake rigging which is wholly independent of said upper brake rigging for actuating all of the lower shoes.

Another feature of my invention consists in supporting the upper brake rigging by means of upwardly extending supporting levers to which the upper brake shoes are attached, and in the provision in connection with each supporting lever of spring means for moving the supporting levers away from the wheels upon release of the brakes to positions in which the brake shoes are held clear of the wheels.

A further feature of my invention consists in so constructing the spring means for moving the supporting levers to their retracted positions that these means will automatically adjust themselves in response to brake shoe and wheel wear in such a manner that the brake shoes attached to these levers will be moved the same distances away from the wheels upon release of the brakes irrespective of the degree of brake shoe or wheel wear.

A still further feature of my invention consists in so constructing the upwardly extending supporting levers which support the brake shoes that are located between adjacent wheels that these levers may be located inside of the plane of the adjacent whels without interference with or by adjacent parts of the locomotive and will be effective to resist side sway of the brake rigging.

A further feature of my invention resides in constructing both said brake riggings with a view to provide the necessary clearances between the brake riggings and the adjacent parts of the locomotive.

I shall describe one form of brake mechanism embodying my invention, and shall then point out the novel features thereof in claims.

In the accompanying drawings, Fig. 1 is a view, partly diagrammatic and partly in side elevation, showing one form of brake mechanism embodying my invention applied to the driving wheels of a locomotive. Figs. 2 and 3 are top plan views, partly diagrammatic, illustrating different portions of the brake mechanism shown in Fig. 1, certain parts of the mechanism being omitted from these figures for the sake of clearness, Fig. 4 is a left-hand end view of the brake rigging illustrated in Fig. 1. Fig. 5 is a sectional view of the brake rigging illustrated in Fig. 1 taken substantially on the line V—V of Fig. 1. Figs. 6 and 7 are enlarged detail views of portions of the brake rigging illustrated in Figs. 1 and 3.

Similar reference characters refer to similar parts in each of the several views.

Referring to the drawings, I have here shown my invention applied to the driving wheels 1, 2 and 3 of a locomotive of the type having three pairs of driving wheels located as closely together as the necessary clearance between the wheels themselves will permit to decrease the overall length of the locomotive, and thus facilitate the negotiation of curves by the locomotive. In the interest of clarity, and in order to simplify the disclosure all parts of the locomotive which are not essential to a complete understanding of my invention are omitted from the drawings.

Extending transversely of the wheels 1, 2 and 3 considerably below the horizontal plane passing through their centers are brake beams 4, 5 and 6, and extending transversely of the wheels 1, 2 and 3 considerably above the horizontal plane passing through their centers are other brake beams 7, 8 and 9, the brake beams 7 and 8 being disposed directly above the brake beams 5 and 6, respectively.

The brake beam 4 is supported for movement toward and away from the wheel 1 between brake applying and brake releasing positions by means of a pair of hanger levers 10, the upper ends of which are pivotally secured to the locomotive frame by means of pins 11 mounted in suitable bifurcated supports 12, and the lower ends of which are pivotally connected with the opposite ends of the brake beam. Secured to each of the levers 10 intermediate its ends is a brake head 14 carrying a brake shoe 15 which, when the brake beam 4 is moved to its brake applying position, is adapted to engage the associated wheel 1 in a zone located some distance below the horizontal plane passing through the axis of the wheel. As will be apparent from an inspection of Fig. 4, the upper ends of the levers 10 are disposed within the plane of the associated wheel, while the lower ends of these levers are offset outwardly a slight amount. The reason for this construction is to provide clearance for the frame of a trailer truck (not shown).

The brake beams 5 and 6 are supported for movement toward and away from the associated wheels 2 and 3 by means of associated pairs of hanger levers 16 and 17. These latter hanger levers are all alike, and as shown in Fig. 5, the hanger levers 16 are each provided with a forked upper end 16a which is disposed inside of the plane of the adjacent wheels 1 and 2, and with an outwardly offset lower end 16b which extends into the plane of the wheels. The forked upper end of each lever 16 straddles a support 18 provided on the engine frame and receives a pin 19 mounted in the support 18, while the offset lower end of each lever 16 is pivotally connected with the adjacent end of the brake beam 5. Each of the levers 16 and 17 has pivotally attached thereto a brake head 14 carrying a brake shoe 15 which, when the associated brake beam is moved to its brake applying position, is adapted to engage the associated wheel 2 or 3 in a zone located some distance below the horizontal plane extending through the axis of the wheel. It should be noted that the forked ends of the levers 16 and 17 act to effectively prevent side sway of the associated brake beams and the parts connected thereto.

The brake beams 7 and 8 are supported for movement toward and away from the associated wheels 1 and 2 to brake applying and brake releasing positions by means of pairs of supporting levers 20 and 21, respectively, one of which levers is located adjacent each end of the associated brake beam. These supporting levers are all alike and are each secured to the locomotive and to the associated brake beam in the same manner that the supporting levers 20 shown in Fig. 5 are secured to the locomotive and to the brake beam 7. Referring to Fig. 5, each supporting lever 20 is pivotally mounted at its lower end on a bolt or pin 22 secured to a side member of the locomotive frame, and is provided at its upper end with a through hole 23 which receives the adjacent end of the brake beam 7. Each supporting lever 20 is also provided adjacent its upper end with a depending hook portion 24 which extends downwardly past a web 25 provided on the engine frame and cooperates with the web in such manner that the support is free to rock about the bolt 22 as an axis, but is prevented from moving laterally with respect to the engine frame, whereby side sway of the associated parts of the brake rigging is prevented. It will be noted that the lower ends of the levers 20 and associated bolts are disposed inside of the planes of the associated wheels, whereas their upper ends are offset outwardly from their lower ends and extend into the planes of the associated wheels. A brake head 14 carrying a brake shoe 15 is secured to each supporting lever 20 in such a position that when these levers are moved to their brake applying positions, the associated shoes will engage the wheels 1 in zones which are diametrically opposite to the zones at which the brake shoes 15 secured to the hanger levers 10 engage the wheels 1. In a similar manner, a brake head 14 carrying a brake shoe 15 is secured to each supporting lever 21 in such a position that when these supporting levers are moved to their brake applying positions, the associated brake shoes will engage the wheels 2 in zones which are diametrically opposite to the zones at which the brake shoes 15 secured to the hanger levers 16 engage the wheels 2.

The brake beam 9 is supported for movement between brake applying and brake releasing positions by means of a pair of supporting levers 26 which are pivotally secured at their lower ends to the locomotive frame by means of pins 27, and the upper ends of which are pivotally connected with the opposite ends of the brake beam. Each of the levers 26 has pivotally secured thereto a brake head 14 carrying a brake shoe 15 which, when the brake beam 9 is moved toward the left to its brake applying position, is adapted to engage the associated wheel 3 in a zone which is diametrically opposite to the zone in which the shoe 15 secured to the hanger lever 17 engages the wheel 3.

Associated with each brake head 14 is a brake head balancing device 29 which in itself forms no part of my present invention, and which may, for example, be similar to that disclosed and claimed in my copending application for Letters Patent of the United States, Serial No. 96,953, filed on August 20, 1936, for Brake head balancing device.

It will be seen from the foregoing that when the brake beams are moved to their brake applying positions, each wheel will be clasped between a pair of diametrically opposite brake shoes, whereby heavy reaction pressure and tendencies to wheel displacements are avoided.

The brake rigging also comprises two separate and independent sets of operatively connected rods and levers, one for actuating all of the lower brake beams 4, 5 and 6, and the other for actuating all of the upper brake beams 7, 8 and 9.

The first mentioned set of operatively connected rods and levers is shown most clearly in Fig. 2, and comprises two vertically disposed brake cylinder levers 30 and 31 which are pivotally supported intermediate their ends on pins 32 mounted in the engine frame, and the upper ends of which are separately connected with the push rods 33 of a pair of brake cylinders C1 and C2 secured to the engine frame. These brake cylinders are of well-known construction and each includes the usual cylinder body, reciprocable piston (not shown) biased to the inner end of its stroke by the usual release spring (not shown), and the push rod 33 which is operatively connected with the piston.

The lower ends of the brake cylinder levers 30 and 31 are each operatively connected with an associated horizontally disposed equalizer lever 35 intermediate its ends by means of a pull rod 36. Each pull rod 36 is provided intermediate its ends with a turnbuckle adjustment 36a of well-known construction for taking up slack, and at the end which is connected with the associated equalizer lever 35 with a jaw 36b which receives the equalizer lever.

The inner ends of the equalizer levers 35 are both connected through the medium of a link 39 with the brake beam 6 at or near its center, and the outer ends of the levers 35 are connected through the medium of pull rods 76 with equalizer levers 37 at or near their centers. The pull rods 76 are each provided at the end which is connected with the associated equalizer lever 35 with a jaw 76a which straddles the brake beam 6 and which receives the equalizer lever, and at its opposite end with a jaw 76b which receives the associated equalizer lever 37.

The equalizer levers 37 are connected at their inner ends with the brake beam 5 at points equally spaced from its ends by means of links 38, while the outer ends of these equalizer levers are connected by means of pull rods 79 to the brake beam 4 at points equally spaced from its ends. The pull rods 79 are provided at the ends which are connected with the equalizer levers 37 with jaws 79a which straddle the brake beam 5 and receive the associated equalizer lever, and at their opposite ends with jaws 79b which receive the brake beam 4.

The set of operatively connected rods and levers for actuating the brake beams 7, 8 and 9 includes two vertically disposed brake cylinder levers 40 and 41 which are pivotally secured intermediate their ends to the locomotive frame by means of pins 43, and the lower ends of which are connected by means of pull rods 44 to the opposite ends of a main equalizer lever 45 (see Fig. 3). The lower ends of the brake cylinder levers 40 and 41 are also connected by means of the pull rods 44 and other pull rods 46 with the opposite ends of a main equalizer lever 47. The main equalizer lever 45 is connected at or near its center with the push rod 48 of a brake cylinder C3 by means of a double jaw 49, and the equalizer lever 47 is similarly connected at or near its center with the push rod 48 of a brake cylinder C4 by means of a double jaw 49. It will be seen, therefore, that the two brake cylinder levers 40 and 41 are actuated by the brake cylinders C3 and C4 connected in tandem. The brake cylinders C3 and C4 may be similar to the previously described brake cylinders C1 and C2.

Each of the brake cylinder levers 40 and 41 is operatively connected at its upper end with an associated horizontally disposed equalizer lever 50 intermediate its ends by means of a pull rod 51. Each pull rod 51 is provided at the end which is connected to the associated brake cylinder lever with a slack adjuster 51a of well-known construction, and at its opposite end with a jaw 51b which receives the associated equalizer lever 50.

The equalizer levers 50 are similar to the previously described equalizer levers 35 of the lower brake rigging and are both connected at their inner ends through the medium of a link 52 with the brake beam 7 at or near its center. The outer ends of the levers 50 are connected, through the medium of pull rods 53, with equalizer levers 54, the pull rods 53 and the equalizer levers 54 being similar to the previously described pull rods 76 and equalizer levers 37. The pull rods 53 are each provided at the end which is connected to the associated equalizer lever 50 with a jaw 53a which straddles the brake beam 7, and which receives the equalizer lever, and at the opposite end with a jaw 53b which receives the associated equalizer lever 54.

The equalizer levers 54 are connected at their outer ends with the brake beam 8 at points equally spaced from its ends through the medium of links 55, while the inner ends of these equalizer levers are connected by means of pull rods 56 with the brake beam 9. In the particular locomotive to which I have shown my invention applied in the drawings the reverse gear shaft 57 (see Fig. 1) extends from one side of the locomotive to the other adjacent the one side of the brake beam 8, and in order to provide the necessary clearance between this shaft and the pull rods 56, each of these pull rods is provided at the end which is attached to the equalizer lever 54 with a jaw 56a which is sufficiently wide to straddle the reverse gear shaft 57 with ample clearance, and which jaw also straddles the main equalizer lever 47 and the brake beam 8, suitable spacers 59 being provided between the sides of the jaw and the equalizer lever 54, and a compression member 56b also being provided between the sides of the jaw to maintain the jaw sides in suitable spaced relation. The opposite ends of the pull rods 56 are provided with jaws 56c which receive the brake beam 9.

When it is desired to apply the brakes, fluid pressure is simultaneously supplied to all four brake cylinders C1, C2, C3 and C4, which fluid pressure causes the associated push rods to move outwardly in opposition to the bias of the release springs. The movement of the push rods 33 of the brake cylinders C1 and C2 acts through the lower set of interconnected rods and levers to move the lower brake beams 4, 5 and 6 toward the wheels to their braking positions, and hence causes the hanger levers 10, 16 and 17 to rotate in counterclockwise directions to the positions in which the associated brake shoes 15 frictionally engages the wheels 1, 2 and 3, while the movement of the push rods 48 of the brake cylinders C3 and C4 similarly acts through the upper set of interconnected rods and levers to move the upper brake beams 7, 8 and 9 toward the wheels to their brake applying positions and hence causes the supporting levers 20, 21 and 26 to rotate in counterclockwise directions to the positions in which the associated brake shoes 15 frictionally engage the wheels 1, 2 and 3, thus applying clasp brakes to all three wheels.

When the fluid supplied to the brake cylinders of the brake mechanism is subsequently vented to atmosphere, the release springs in the brake cylinders move the push rods into the brake cylinders to their retracted positions, which movement releases the force tending to press the brake shoes against the wheels, whereupon the lower brake beams return to their brake releasing positions by gravity, and hence cause the lower brake shoes 15 to move out of engagement with the wheels. However, inasmuch as the upper brake shoes are disposed to one side of the vertical plane passing through the axis about which the associated supporting levers pivot, and the supporting levers are rotated beyond their vertical positions when the upper brake shoes are in brake applying positions, the force of gravity tends to hold the upper brake shoes in their brake applying positions in opposition to the force due to the release springs provided in the brake cylinders C3 and C4, and since there is usually a certain amount of unavoidable lost motion between the various interconnected rods and levers which actuate the upper brake beams, the upper brake shoes have a tendency to drag.

It is desirable to prevent the upper brake shoes from dragging, and to this end each supporting lever has associated therewith spring means embodying my invention for moving the supporting levers away from the wheels upon release of the brakes to positions in which the associated brake shoes will be clear of the treads of the wheels. These spring means are similar, and a description of one will therefore suffice for all.

Referring particularly to the spring means, shown in Figs. 6 and 7 for moving the one supporting lever 21 away from the associated wheel 2, this means comprises a rod 60 which is slidably mounted intermediate its ends in a hole 61 formed in a suitable support 62 provided on the engine frame, and which is provided at one end with a flat portion 60a. A longitudinally extending slot 60b is formed in the flat portion 60a, and extending with some clearance through a hole 63 formed in an upstanding lug 64 provided on the upper end of the lever 21 and through the slot 60b is a bolt 65 provided with a castellated nut 66. Surrounding the bolt 65 between a washer 67 which abuts against the flat portion 69a of the rod 60 and a washer 68 which abuts against the nut 66 is a compressed coil spring 69 which causes the rod 60 to frictionally engage the lever 21 with considerable force for a purpose which will appear presently.

The right-hand end of the rod 60 is threaded for the reception of a castellated nut 60c, and has slidably mounted thereon between the nut 60c and the support 62 a sleeve 70. Sleeve 70 is formed at the end adjacent to the support 62 with an annular flange 71 and is surrounded by a coil spring 72 one end of which abuts against the flange 71, and the other end of which abuts against a washer 73 which engages the nut 69.

The supporting lever 21 is initially secured to the rod 60 in such a position that when this lever is moved to its brake applying position, the rod 60 will be moved to the left to the position in which the sleeve 70 engages the washer 63, and the stiffness of the spring 69 is such and the nut 66 is so adjusted that the frictional force which is exerted between the rod 60 and the lever 21 will be sufficient to cause the spring 72 to become compressed to the point at which the sleeve 70 engages the washer 73 in response to movement of the lever 21 to its brake applying position, and to cause the lever 21 to move away from its brake applying position in response to movement of the rod 60 toward the right, without causing the bolt 65 to slide along the slot 60b, but that, if the movement of the lever 21 in a counterclockwise direction necessary to cause a brake application subsequently increases due to wheel or brake shoe wear, the bolt 65 will then slide along the slot 60b to a new position. Furthermore, the stiffness of the spring 72 is such that when the brakes are released, this spring will move the lever 21 away from the associated wheel far enough to permit the desired clearance between the associated brake shoe and the treads of the wheel. The slot 60b is sufficiently long to permit the maximum amount of adjustment required for the maximum permissible wheel and brake shoe wear, and also to prevent damage to the parts in the event the lever 21 is rotated in a counterclockwise direction beyond its normal brake applying position due to abnormal wheel displacement while the brakes are in their applied positions.

With the spring means constructed in this manner, it will be apparent that the sleeves 70 of these spring means will prevent the associated rods 60 from moving toward the right in response to an application of the brakes beyond predetermined positions, and that as a result, due to the previously described adjustment of the parts, as the wheels or brake shoes wear, the additional movement of the supporting levers in counterclockwise directions necessary to cause the brake shoes to engage the wheels will cause the bolts 65 to slide along the associated slots 60a in the rods 60 to new positions, with the result that when the brakes are next released the supporting levers will be moved away from the wheels by the spring 72 to such positions that the same clearance will then exist between the brake shoes and the wheels as existed before the wheel or brake shoe wear took place.

Although I have herein shown and described only one form of brake mechanism embodying my invention, it is understood that various changes and modifications may be made therein within the scope of the appended claims without departing from the spirit and scope of my invention.

Having thus described my invention, what I claim is:

1. In a brake mechanism for a vehicle having closely spaced wheels, diametrically opposite brake shoes associated with each wheel one disposed above and one below the horizontal plane passing through the wheel axis, supporting levers for supporting the upper shoes, hanger levers for supporting the lower shoes, an upper set of interconnected rods and levers for actuating all of said supporting levers, and a lower set of interconnected rods and levers for actuating all of said hanger levers.

2. In a brake mechanism for a vehicle having closely spaced wheels, diametrically opposite shoes associated with each wheel one disposed above and one below the horizontal plane passing through the wheel axis, supporting levers for the upper shoes pivotally supported inside of the plane of the wheels, hanger levers for the lower shoes pivotally supported inside of the plane of the wheels, an upper set of interconnected rods and levers for actuating all of said supporting levers, and a lower set of interconnected rods and levers for actuating all of said hanger levers.

3. In a brake mechanism for a vehicle having closely spaced wheels, diametrically opposite brake shoes associated with each wheel one disposed above and one below the horizontal plane passing through the wheel axis, supporting levers for supporting the upper shoes, hanger lever for supporting the lower shoes, a brake beam supported by the two supporting lever associated with each pair of wheels on the same axle, a brake beam supported by the two hanger levers associated with each pair of wheels on the same axle, fluid pressure means for simultaneously actuating all of the brake beams supported by said supporting levers, and other fluid pressure means for simultaneously actuating all of the brake beams supported by said hanger levers.

4. In a brake mechanism for a vehicle having at least two longitudinally aligned wheels at each side of the vehicle and arranged closely together, two brake shoes located between the wheels at each side of the vehicle and arranged one above and one below the closest portions of the treads of said wheels and each being movable into braking engagement with the tread of the adjacent wheel, separate levers for supporting each of said brake shoes, fluid pressure means connected with the levers which support the upper shoes for actuating these levers, and other fluid pressure means connected with the levers which support the lower shoes for actuating these levers.

5. In a brake mechanism for vehicles having at least two longitudinally aligned wheels at each side of the vehicle and arranged closely together, two brake shoes located between the wheels at each side of the vehicle and arranged one above and one below the closest portions of the treads of said wheels and each being movable into braking engagement with the tread of the adjacent wheel, two supporting levers one pivotally attached at its lower end to the vehicle at each side of the vehicle for supporting the upper brake shoes, two hanger levers one pivotally attached at its upper end to the vehicle at each side of the vehicle for supporting the lower brake shoes, a first brake beam supported at its ends by the upper ends of said supporting levers, a second brake beam supported at its ends by said hanger levers, said brake beams being movable in opposite directions to actuate said levers, and separate fluid pressure responsive means for actuating each of said brake beams.

6. In a brake mechanism for vehicles having closely spaced wheels, two supporting levers pivotally attached at their lower ends to the vehicle frame at opposite sides of the vehicle inside of the plane of the wheels and each extending at its upper end into the plane of the wheels between two adjacent wheels, a brake shoe secured to each lever intermediate its ends and adapted to frictionally engage the tread of one of the adjacent wheels, means connected with said levers at their upper ends for moving the levers in directions to cause the brake shoes to frictionally engage the associated wheels, and means on each lever cooperating with means on the vehicle frame to prevent side sway of the levers and associated parts of the brake mechanism.

7. In a brake mechanism for vehicles having closely spaced wheels, two supporting levers pivotally attached at their lower ends to the vehicle frame at opposite sides of the vehicle inside of the plane of the wheels and each extending at its upper end into the plane of the wheels between two adjacent wheels, a brake shoe secured to each lever intermediate its ends and adapted to frictionally engage the tread of one of the adjacent wheels, and means connected with said levers at their upper ends for moving the levers in directions to cause the brake shoes to frictionally engage the associated wheels, each said lever being provided adjacent its upper end with a depending hook portion which cooperates with a web on the vehicle frame to prevent lateral motion of the levers, whereby side sway of the brake mechanism is prevented.

8. In a brake mechanism for vehicles having closely spaced wheels, a supporting lever pivotally mounted at its lower end on a pin secured to a portion of the vehicle frame inside of the plane of each wheel and each provided adjacent its upper end with a brake shoe which is adapted to frictionally engage the tread of the adjacent wheel, a brake beam supported by the upper ends of each two levers associated with the same pair of wheels, means connected with said brake beams for actuating them to move the levers toward the associated wheels to brake applying positions, and means associated with said levers for preventing side sway of the brake mechanism.

9. In a brake mechanism for vehicles having closely spaced wheels, a supporting lever pivotally mounted on a pin secured to a portion of the vehicle frame inside of the plane of each wheel and each provided adjacent its upper end with a brake shoe which is adapted to frictionally engage the tread of the adjacent wheel, a brake beam supported by the upper ends of each two levers associated with the same pair of wheels, means connected with said brake beams for actuating them to move the levers toward the associated wheels to brake applying positions, and a depending hook portion provided on each lever adjacent its upper end extending downwardly past and cooperating with a web provided on the vehicle frame to prevent side sway of the brake mechanism.

10. In a brake mechanism for a vehicle, two supporting levers pivotally attached to the vehicle frame one adjacent each wheel of a pair of wheels and each provided with a brake shoe which is adapted to engage the tread of the adjacent wheel above the horizontal plane passing through the wheel axis, a brake beam supported at its ends by said levers, means connected with said brake beam for actuating it to move said levers to brake applying positions, a lug formed on the upper end of each lever and provided with a hole, two rods each slidably mounted intermediate its ends in a hole formed in a support provided on the vehicle frame and each provided at one end with a flattened portion having a longitudinally extending slot formed therein, a bolt extending through each said slot and the hole in a different one of said lugs, spring means on each said bolt for causing the associated rod to frictionally engage the associated lever, spring means on the other end of each said rod for biasing the rod to one position, the parts being so proportioned that when said levers are moved to their brake applying positions the associated rod will frictionally engage the associated levers with sufficient force to compress the springs on the rods an amount which when the brakes are subsequently released will act through the rods to move the levers to brake releasing positions in which the associated brake shoes are clear of the wheels.

11. In a brake mechanism for a vehicle, two supporting levers pivotally attached at their lower ends to the vehicle frame one adjacent each wheel of a pair of wheels and each provided with a brake shoe which is adapted to engage the tread of the adjacent wheel above the horizontal plane passing through the wheel axis, a brake beam supported at its ends by the upper ends of said levers, means connected with said brake beam for actuating it to move said levers to brake applying positions, a lug formed on the upper end of each lever and provided with a hole, two rods each slidably mounted intermediate its ends in a hole formed in a support provided on the vehicle frame and each provided at one end with a flattened portion having a longitudinally extending slot formed therein, a bolt extending through each said slot and the hole in a different one of said lugs, spring means on each said bolt for causing the associated rod to frictionally engage the associated lever, a sleeve on the other end of each said rod for limiting the movement of the rods in response to movement of said levers to their brake applying positions, and a spring on the other end of each said rod for moving the levers away from the wheels upon release of the brakes.

12. In a brake mechanism for a railway vehicle having closely spaced wheels, two separate and independent sets of brake rigging one for moving brake shoes which are disposed above the plane of the wheel axes into engagement with the wheels and the other for moving brake shoes which are disposed below the plane of the wheel axes into engagement with the wheels, said brake shoes being arranged to provide clasp brakes for each wheel.

13. In a brake mechanism for a railway vehicle having closely spaced wheels, two similar, separate and independent sets of brake rigging one for moving brake shoes which are disposed above the plane of the wheel axles into engagement with the wheels and the other for moving brake shoes which are disposed below the plane of the wheel axles into engagement with the wheels, said brake shoes being arranged to provide clasp brakes for each wheel, and means associated with said upper brake rigging for moving the associated shoes away from the wheels upon release of the brakes in opposition to the force of gravity tending to retain the shoes in engagement with the wheels.

14. In a brake mechanism for a railway vehicle having closely spaced wheels, two similar, separate and independent sets of brake rigging one for moving brake shoes which are disposed above the plane of the wheel axles into engagement with the wheels and the other for moving brake shoes which are disposed below the plane of the wheel axles into engagement with the wheels, said brake shoes being arranged to provide clasp brakes for each wheel, and means associated with said upper brake rigging for moving the associated shoes away from the wheels upon release of the brakes in opposition to the force of gravity tending to retain the shoes in engagement with the wheels, said means being so constructed that the brake shoes actuated by the upper brake rigging will be moved the same distances away from the wheels upon release of the brakes regardless of brake shoe or wheel wear.

15. In a brake mechanism for a vehicle, a brake element movable into and out of braking engagement with a wheel and axle assembly of the vehicle, a member pivotally connected to a fixed part of the vehicle for actuating said element, and means on said member interlocking with said fixed part for maintaining the member and thereby the brake element against side sway without interference with the pivotal movement of the member.

16. In a brake mechanism for a vehicle, a brake element movable into and out of braking engagement with a wheel and axle assembly of the vehicle, a member pivotally connected at its lower end to a fixed part of the vehicle for actuating said element, and means on said member interlocking with said fixed part for maintaining the member and thereby the brake element against side sway without interference with the pivotal movement of the member.

17. In a brake mechanism for a vehicle, a brake element movable into and out of braking engagement with a wheel and axle assembly of the vehicle, a member pivotally connected to a fixed part of the vehicle for actuating said element, a brake beam connected with and supported by said member for actuating said member, and means on said member interlocking with said fixed part for maintaining the movable parts against side sway without interference with the pivotal movement of the member.

18. In a brake mechanism for a vehicle, a brake element movable into and out of braking engagement with a wheel and axle assembly of the vehicle, a member pivotally connected at its lower end to a fixed part of the vehicle for actuating said element, a brake beam connected with and supported by said member for actuating said member, and means on said member interlocking with said fixed part for maintaining the movable parts against side sway without interference with the pivotal movement of the member.

19. In a brake mechanism for a vehicle, a brake element movable into and out of braking engagement with a wheel and axle assembly of the vehicle, a member pivotally connected to a fixed part of the vehicle for actuating said element, and a hook portion on said member interlocking with said fixed part for maintaining said member and thereby said brake element against side sway without interference with the pivotal movement of the member.

20. In a brake mechanism for a vehicle, a brake element movable into and out of braking engagement with a wheel and axle assembly of the vehicle, a lever pivotally secured at its lower end to a fixed part of the vehicle for actuating said element, a brake beam supported by said lever, means connected with said brake beam for actuating it to actuate said lever, and a hook portion on said lever interlocking with said fixed part for maintaining the movable parts against side sway without interference with the pivotal movement of said lever.

21. In a brake mechanism for a railway vehicle, a supporting lever pivotally mounted at its lower end on the vehicle frame and provided with a brake shoe adapted to frictionally engage one of the vehicle wheels in response to movement of the lever toward the wheel and connected with means for moving the lever toward the wheel, other means connected with said lever for moving it away from the wheel upon release of the brakes, and means on said lever cooperating with means on the vehicle frame to prevent side sway of said lever and associated parts of the brake mechanism.

EMIL G. MUELLER.